United States Patent [19]

Mani et al.

[11] Patent Number: 4,539,373

[45] Date of Patent: Sep. 3, 1985

[54] THERMOPLASTIC POLYELECTROLYTE COMPLEXES

[75] Inventors: Inder Mani, Midland; Glen L. Gunderman, Clare, both of Mich.

[73] Assignee: The Dow Chemical Company, Midland, Mich.

[21] Appl. No.: 397,625

[22] Filed: Jul. 12, 1982

[51] Int. Cl.$^3$ .................... C08L 33/02; C08L 39/00; C08L 33/04; C08L 41/00

[52] U.S. Cl. .................................... 525/203; 525/201; 525/208; 525/209; 525/213; 525/214; 525/217; 525/221; 525/228; 525/913; 525/931

[58] Field of Search ............... 525/212, 221, 228, 931, 525/203, 208, 209, 214

[56] References Cited

U.S. PATENT DOCUMENTS

| | | | |
|---|---|---|---|
| 3,236,914 | 2/1966 | Murdock et al. | 525/931 |
| 3,419,430 | 12/1968 | Michaels | 136/26 |
| 3,419,431 | 12/1968 | Michaels | 136/26 |
| 3,546,142 | 12/1970 | Michaels et al. | 260/2.1 |
| 4,118,439 | 10/1978 | Marze | 525/238 |

FOREIGN PATENT DOCUMENTS 1463175  2/1977  United Kingdom .

*Primary Examiner*—Carman J. Seccuro
*Attorney, Agent, or Firm*—Gary C. Cohn

[57] ABSTRACT

Novel thermoplastic polyelectrolyte complexes are disclosed which are the reaction products of (a) a polyanion and (b) a polycation wherein one of the polyanion and polycation contains repeating units derived from a soft monomer. By the selection of said soft monomers and of the cation group present in the polycation, moldable, extrudable polyelectrolyte complexes are obtained.

15 Claims, No Drawings

THERMOPLASTIC POLYELECTROLYTE COMPLEXES

BACKGROUND OF THE INVENTION

This invention relates to polyelectrolyte complexes, more particularly to thermoplastic polyelectrolyte complexes.

Polyelectrolyte complexes (PEC) are prepared by the reaction of a polyanion (PA) and polycation (PC) to form an ionically crosslinked polymer. Said PEC are usually the reaction product of a polyanion containing a plurality of strong acid groups such as sulfonic acid groups and the polycation having a plurality of strong base groups, i.e., quaternary ammonium groups. Such PEC are described in various references including, for example, U.S. Pat. Nos. 3,276,598; 3,546,142; 3,558,744 and 3,565,973 to Michaels. PEC have unique properties which make them especially suitable for use as battery separators, antithrombogenic plastics, inverse osmosis dialysis or ultra-filtration membranes, antistatic agents, dye acceptors and components in artificial leathers.

Unfortunately, difficulties in processing PEC into useful forms greatly restrict the wide-spread application of these complexes. Conventional PEC are not thermoplastic, i.e., they are not moldable or extrudable, so they must be handled as solutions. See Michaels, "Polyelectrolyte Complexes," *Kirk Othmer Encyclopedia of Chemical Technology*, 2nd Ed., Vol. 16, page 119, (1968). However, most conventional PEC are not soluble in water or organic solvents and must be dissolved in a ternary system of water, inorganic salt and a polar organic solvent such as dioxane or acetone. The proper proportions of water, salt and organic solvent in said ternary solvent systems must be experimentally determined for each PEC. The dissolved PEC must be recovered by the removal of the solvent or by adjusting the composition of the ternary solvent so that the PEC is no longer soluble therein. Generally, large amounts of water are added to the ternary solvent to precipitate the PEC. Recently, Merze, in U.S. Pat. No. 4,118,437, has developed organic soluble PEC. However, the use of such PEC still requires the use of solvents which must be removed to recover the PEC in the desired form. Because of these difficulties in working with solutions of conventional PEC, it would be desirable to have an easily handled PEC.

In addition, conventional PEC generally have poor mechanical properties, i.e., they are hard and brittle and must be plasticized or combined with other materials to provide mechanical strength. However, since PEC are not moldable or extrudable, combining the PEC with plastics and other fillers is difficult and generally yields poor results.

Accordingly, it would be desirable to have an easily processable, thermoplastic PEC which can be readily blended with plastics and fillers.

SUMMARY OF THE INVENTION

The PEC of this invention are thermoplastic polyelectrolyte complexes comprising (a) a water-soluble polyanion ionically crosslinked with (b) a water-soluble polycation containing a plurality of pendant cationic moieties. In a preferred embodiment, at least one of the polyanion and the polycation contains repeating soft mers, and the proportion of said soft mers contained in said polycation and polyanion and the cationic moities present in said polycation are chosen such that said polyelectrolyte complex is thermoplastic.

The PEC of this invention are useful for all the applications for which conventional PEC are employed. Because of the incorporation of soft units into at least one of the polyions, and the structure of the cationic moities of the polycation, the PEC of this invention are moldable and extrudable at temperatures conventionally used for the molding and extrusion of plastic materials. Accordingly, they can be readily processed and formed into the desired shape without the use of organic solvents or complex ternary solvent systems. Moreover, these PEC are readily admixed and extruded with various plastics and other fillers such as polyethylene, polystyrene, wood fibers, pigments and the like.

DETAILED DESCRIPTION OF THE INVENTION

The thermoplasticity of the PEC of this invention is determined primarily by two factors: (1) the incorporation of repeating soft units into at least one of the polyions and (2) the structure of the cationic moiety. Thus, the structural requirements of the cationic moiety are somewhat determined by the type and proportion of the soft units which are present in the polyanion or polycation, and vice versa. Accordingly, the structure of the cationic moiety and the proportion of soft units present in the polyions are chosen together such that the PEC prepared therefrom is thermoplastic.

The cationic moieties are generally quaternary or tertiary ammonium, pyridinium, phosphonium or sulfonium ions. Of these, the tertiary or quaternary ammonium ions are preferred on the basis of their relatively low cost and easy synthesis.

The ammonium ions preferably employed in the invention have the general structure: $-N^{\oplus}R^1R^2R^3$ wherein $R^1$, $R^2$ and $R^3$ are each independently an inertly substituted hydrocarbyl or polyether group having from 1 to about 30 carbon atoms. In addition, $R^1$ may be hydrogen, in which case the cationic moiety is a tertiary ammonium ion. While the size of the R groups required to form a thermoplastic PEC depends somewhat on the proportion of soft units present in the polyions, in general the R groups together contain at least 5, more preferably at least 8 carbon atoms. In general, thermoplasticity in the PEC is favored by increasing the amount of soft units present in the polyions, and by increasing the size of the cationic groups in the PC. Accordingly, by using a high proportion of soft units in the polyions, the size of the cationic group may be relatively small and vice versa.

When $R^1$ is not hydrogen, the ammonium ion is a so-called "strong base" ion which will be positively charged over essentially the entire pH range. PEC prepared from polycations having strong base cationic groups will remain ionically crosslinked at all pH levels. The groups $R^1$, $R^2$ and $R^3$ may be the same or different provided that together they contain at least 5 carbon atoms. Preferably, $R^1$, $R^2$ and $R^3$ are all inertly substituted hydrocarbyl groups having from about 1 to about 30, preferably 1 to 20, more preferably 1 to 16, carbon atoms. Exemplary quaternary ammonium groups ($-N^{\oplus}R^1R^2R^3$ groups) include triethylammonium, triethanolammonium, butyldimethylammonium, dodecyldimethylammonium, diethyldodecylammonium, dimethylhexadecylammonium, didodecylmethylammonium, dimethyloctoammonium, ethanolethyldodecylammonium, dodecyl(2-chloroethyl)methylammonium and like groups. Most preferred are dimethylalkylammonium groups where the alkyl group has from about 6 to 16 carbon atoms.

When $R^1$ is hydrogen, the cationic group will be a so-called "weak base" group and its ability to carry a positive charge will vary with pH. Such weak base polycations will generally be ionized when the pH of the solution is in the range from about 0 to about 10, preferably from about 0 to about 9, more preferably from about 2 to about 8. Accordingly, PEC formed from such weak base polycations will exist only when the pH is within the aforementioned ranges. Exemplary weak base groups include methylpentylammonium, ethylbutylammonium, ethyldodecylammonium, methylhexylammonium and similar groups.

In addition to the aforementioned ammonium ions, cyclic ammonium ions as represented by the general structures:

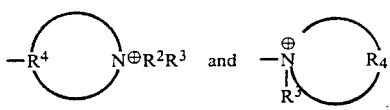

wherein $R^2$ and $R^3$ are as defined hereinbefore and $R^4$ is an inertly substituted alkylene diradical which, together with the nitrogen atom, forms a heterocyclic group, are advantageously employed herein. The size of the groups $R^2$, $R^3$ and $R^4$ determines the ability of the cationic moiety to impart thermoplasticity to the PEC. In general, the groups $R^2$, $R^3$ and $R^4$ will together contain at least 5 carbon atoms, preferably at least 8 carbon atoms.

Pyridinium ions beneficially employed herein can be represented by the general structure:

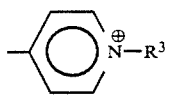

wherein $R^3$ is as defined hereinbefore. Again, $R^3$ advantageously contains at least 1, preferably at least 3 carbon atoms.

Exemplary quaternary phosphonium ions advantageously employed herein include dimethylhexylphosphonium, triethylphosphonium, dimethyldodecylphosphonium, dimethylhexadecylphosphonium, tri(N-N-diethylamino)phosphonium and the like. Exemplary tertiary sulfonium ions include hexylmethylsulfonium, ethylbutylsulfonium, methyldodecylsulfonium, ethylhexadecylsulfonium and the like.

The cationic group can be introduced into the PC directly by the polymerization of an ethylenically unsaturated monomer which bears a cationic group or indirectly by chemically affixing the cationic group to the polymer to form the polycation. Exemplary addition polymerizable ethylenically unsaturated monomers bearing cationic groups include vinyl aromatic ammonium compounds such as vinylbenzyldimethylhexadecylammonium halide and vinylbenzyldiethyldodecylphosphonium halide and the like and vinyl ammonium compounds such as dimethyldodecylvinylammonium halides. It is highly preferred, however, to employ a nonionic monomer which can be converted to a cationic unit of the polycation after the polymerization thereof. A wide range of nonionic monomers are suitably employed including, but not limited to, acrylonitrile, vinyl aromatic compounds such as styrene, vinyl toluene, the diverse halostyrenes vinylnaphthalene, vinylbenzyl halide, and t-butyl styrene; vinyl aliphatic compounds such as vinylidene halide, vinyl halide, vinyl chloroalkyl ethers and 4-halo-1-butene.

The functionalization of the diverse monomers is well known in the art and reference is made thereto. Styrenic polymers are advantageously haloalkylated by means of a Friedel-Crafts reaction and the haloalkylated polymers are then reacted with a secondary or tertiary amine, a tertiary phosphine or a dialkylsulfide. Polymers of vinylbenzyl halides can be reacted directly with a secondary or tertiary amine, or a dialkyl sulfide. Polyvinyl halides, sulfates and the like can be treated with a secondary or tertiary amine or phosphine to attach the cationic group thereto. Polyacrylonitrile is advantageously hydrogenated using Raney nickel catalyst to form a simple amine which is then reacted with the appropriate alkyl halides to form a tertiary or quaternary ammonium group.

The polyanion is a water-soluble polymer having a plurality of anionic groups. Exemplary anionic groups include sulfonate, carboxylate, arsenate, phosphonate and like groups, with sulfonate and carboxylate groups being preferred. Strong acid groups such as sulfonate or arsenate will be essentially completely ionized in solution at essentially all pH levels, whereas weak acid groups such as carboxyl groups will be ionized only at higher pH levels. Accordingly, polyelectrolyte complexes (PEC) prepared from a PA having weak acid groups will form and maintain ionic crosslinks only when the pH of the solution is above the pKa of the corresponding acid. Generally, the pH must be in the range from about 2 to 14, preferably 4 to 12, more preferably from about 6 to 12 in order to form and maintain PEC from a PA having weak acid groups.

The anionic group can be incorporated directly into the PA by the polymerization of an ethylenically unsaturated monomer bearing the anionic group, or by the polymerization and subsequent functionalization of a monomer which can be converted into an anionic unit of the PA. Exemplary sulfonic acid-bearing monomers include the vinyl aromatic sulfonic acids, vinylsulfonic acids, alkylene sulfonic acids, alkylsulfonic esters of acrylic acid such as 2-sulfoethyl acrylate, and N-alkylsulfonic acid derivatives of acrylamide, such as acrylamide methyl propane sulfonic acid. In addition, sulfonation of many polymers is readily achieved by treating the polymers with sulfonic acid, sulfur trioxide or like sulfonating agents. Carboxylic acid groups are advantageously incorporated into the PA using acrylic acids, alkacrylic acid, maleic acid or other ethylenically unsaturated acids. It is further noted that salts of all the acidic monomers described herein are advantageously employed.

At least one of the polyions is a polymer containing repeating units derived from a "soft" monomer as such term is described hereinafter. Preferably, the PC contains repeating soft units. More preferably, both the PC and the PA contain repeating soft units. In general, the polyions will contain a portion of soft units sufficient to impart thermoplasticity to the PEC but less than the amount which would render the polyion insoluble in water. While other factors, particularly the cationic groups present in the polycation, affect the proportion of soft units required to impart thermoplasticity to the PEC, generally the soft unit will comprise from about 20 to about 99, more preferably from about 30 to 95, most preferably from about 40 to 90, mole percent of the repeating units in the polyion containing the soft units.

For purposes of this invention the term "soft monomer" means a monomer which when homopolymerized has a glass transition point ($T_g$) of less than 25° C. Soft units or soft mers as these terms are used herein, refer to repeating unit derived from such soft monomers. Suitable soft monomers include the alkyl or hydroxyalkyl esters of monoethylenically unsaturated carboxylic acids, especially the alkyl esters of acrylic acid. The alkyl or hydroxyalkyl groups advantageously contain from about 2 to about 18 carbon atoms, more preferably fewer than 12 carbon atoms. Examples of such alkyl acrylates include methyl acrylate, ethyl acrylate and propyl acrylate, isopropyl acrylate, sec-butyl acrylate, n-butyl acrylate, hexyl acrylate, 2-ethylhexyl acrylate, decyl acrylate, lauryl acrylate and the like. Exemplary hydroxyalkyl acrylates include hydroxyethyl acrylate, hydroxybutyl acrylate and the like. Also useful are the higher alkyl esters of methacrylic acid such as n-butyl methacrylate, hexyl methacrylate, lauryl methacrylate and the like.

The polyion or polyions containing soft units may optionally contain repeating hard units in an amount such that the PEC made therefrom remains thermoplastic and the polyion made therefrom remains water-soluble. In general, from about 0 to about 79, preferably from about 0 to 50, more preferably from about 0 to about 30, percent by number of the repeating units of the polyion are hard units.

For the purposes of this invention, the term "hard monomer" refers to an ethylenically unsaturated nonionic monomer which when homopolymerized has a $T_g$ of greater than 25° C. The terms "hard units," or "hard mers," as those terms are used herein refers to nonionic mers which are derived from hard monomers. Exemplary hard monomers include acrylonitrile, methacrylonitrile, the monovinylidene aromatic monomers such as styrene, t-butylstyrene, vinyltoluene, α-alkylvinyltoluene, diverse halostyrenes and vinylhalonaphthalene; vinylidene compounds such as vinyl alcohol, vinyl halide, vinylidene halide, and alkyl or hydroxyalkyl esters of methacrylic acid such as methyl methacrylate, ethyl methacrylate and propyl methacrylate, sec-butyl methacrylate, hydroxyethyl methacrylate and the like.

It is noted that some of the aforementioned hard units can be readily converted into ionic units using the diverse processes described herein for converting a nonionic unit to an ionic unit. For example, polymers and copolymers of styrene can be haloalkylated and aminated to form polycations. It is accordingly possible to employ a single monomer to form both the ionic and hard units of the polyions by using less than stoichiometric amounts of reagents in the conversion of the hard units to ionic units of the polyion so that only a proportion of said hard units are so converted. However, it is highly preferred that different monomers be used to form the hard and ionic units. Most preferably, the hard monomer is one which cannot be readily converted to an ionic unit or which must be converted by way of a process different that that required to convert the desired monomer to an ionic unit. For example, styrene is advantageously used as a hard monomer when vinylbenzyl chloride is used to provide cationic groups. Repeating units derived from vinylbenzyl chloride are readily aminated by treatment with a tertiary amine while the styrenic units cannot be directly aminated.

The process employed to polymerize the diverse monomers to form the PC and the PA is not particularly critical and is considered a matter of choice to the practitioner. Processes for the addition polymerization of ethylenically unsaturated monomers or mixtures thereof are well known in the art and are not considered to be critical to this invention. See, for example, *Polymer Processes*, Schildknecht, Ed., Interscience Publishers, New York, 1956. The PC and the PA may be polymerized using a solution, suspension or emulsion induced polymerizations in the presence of a free radical generating catalyst such as organic peroxides, organic peresters, hydrogen peroxide, azo compounds, sodium persulfate and the like. It is noted, however, that some of these catalysts may be unsuitable in the polymerization of certain monomers. For example, sodium persulfate and other anionic catalysts are unsuitable for the polymerization of monomers bearing cationic groups. In general, however, the choice of catalyst will be a matter of choice to the skilled artisan and is not considered critical to the invention. Redox systems, UV light and other means of inducing polymerization are also suitably employed in the production of the PC or the PA. Various suspending agents, emulsifiers, inhibitors and other additives such as are known to be useful in the diverse processes for polymerizing ethylenically unsaturated monomers can also be suitably employed to prepare the PC and PA of this invention.

When the desired PA is a copolymer of alkyl acrylates and vinyl sulfonic acids or derivatives thereof, it is preferred that the PA be prepared according to the procedure described in copending application Ser. No. 354,479, filed Mar. 3, 1982, now U.S. Pat. No. 4,389,411. Said process is a solution polymerization using a mixture of methanol and water as a solvent system and sodium metabisulfite and sodium persulfate as redox catalysts. In this process, a quantity of the methanol/water solvent system and sodium metabisulfite is heated to about 60° C. and a solution of the acrylic monomer in methanol is slowly added to the heated solvent system simultaneously with an aqueous solution of the vinyl sulfonic acid or a derivative thereof and sodium persulfate. A water-soluble copolymer having a narrow molecular weight distribution is thus obtained.

The respective molecular weights of the PC and PA are not especially critical as long as the PC and PA are both water-soluble. The term "water-soluble" as used herein, refers not only to polyions which form true solutions, but also to polyions which form stable colloidal dispersions in water. Generally, the molecular weight of the PC can be in the range from about 5,000 to 400,000; that of the PA can be in the range from about 1,000 to 100,000. It has been found, however, that stoichiometric PEC are more readily formed when the molecular weight of the PC and PA is relatively low and when the molecular weight of one of these polyions is significantly less than that of the other polyion. Accordingly, it is preferred that the weight average molecular weight of the PC be in the range from about 5,000 to 100,000 and that the weight average molecular weight of the PA be in the range from 2,000 to 60,000.

The polycation is preferably a copolymer of vinylbenzyl chloride and an alkyl ester of acrylic acid having 1 to 12 carbon atoms in the alkyl group which has been aminated to form a plurality of quaternary ammonium groups. More preferably, the PC is a terpolymer of a $C_2$ to $C_{10}$ alkyl acrylate, vinylbenzyl chloride and styrene which has been aminated with a tertiary amine. Most preferably, the PC is a polymer containing about 40 to 95 mole percent of a $C_2$ to $C_8$ alkyl acrylate, 0 to 50 mole percent styrene and 5 to 50 mole percent vinylbenzyl chloride (VBC), all percentages being based on the total number of moles of monomers employed in the PC.

The PA is advantageously a homopolymer of poly(styrene sulfonate), poly(vinyl sulfonate) or acrylic acid or its salts or a copolymer of vinyl sulfonate or vinyl sulfonic acid with a $C_1$ to $C_{10}$ alkyl acrylate or a sulfonated styrene/$C_1$ to $C_{10}$ alkyl acrylate polymer. Most preferably, the PA is a homopolymer of sodium vinyl sulfonate or a copolymer of an alkyl acrylate and sodium vinyl sulfonate in a mole ratio of about 1:99 to 20:1, especially in a mole ratio from about 1:10 to 10:1.

It is generally preferred to remove salts, low molecular weight species, unpolymerized monomers and the like from the PC and PA prior to the mixing thereof to form the PEC. In general, this can be accomplished by the separate dialysis of the PC and PA or by other known methods of removing such species from polyions.

The PEC is advantageously formed by simple mixing of aqueous solutions of the PA and PC. Preferably, relatively dilute solutions, i.e., solutions containing less than about 15, preferably less than about 5, weight percent of the PA or PC based on the weight of the water, are employed. In general, it is preferred to gradually add a solution of one of the polyions to the other with agitation but both may be simultaneously added to an agitated vessel. When a nonionic PEC is desired, stoichiometric quantities of the polyions are mixed. The resulting mixture will stay in solution until stoichiometry is reached and the resulting neutral PEC will precipitate from solution. Recovery of the neutral PEC is then achieved by filtration and drying.

Alternatively, force blending techniques, as described in U.S. Pat. No. 3,558,744, can also be suitably employed to form the PEC of this invention.

A nonneutral PEC, i.e., one having a net positive or negative charge, is prepared using an excess of one polyion or the other. Since the PEC will precipitate when stoichiometric amounts of the polyions are mixed, nonneutral PEC are advantageously prepared by adding one polyion to an excess of the polyion bearing the charge desired to be placed on the PEC. For example, a PEC having a net negative charge is formed by adding a solution of the polycation to an excess of a solution of the polyanion. In this manner, PEC are formed having a net charge from about 0 to 3 milliequivalents per gram, preferably from 0 to 1.5 meq per gram of the PEC. Because the nonneutral PEC of this invention will not precipitate from solution, initial recovery of said PEC must be effected by removal of the solvent or by changing the composition of the solvent until the nonneutral PEC precipitates such as by adding quantities of salts or organic solvents. However, once recovered from the solution, the nonneutral PEC of this invention are thermoplastic and can be molded or extruded in the same manner as neutral PEC of this invention.

It may be desirable for some applications to have a PEC containing free functional groups, i.e., groups which are available for subsequent reaction with diverse compounds to provide structural modifications of the PEC as needed. Additionally, it is sometimes advantageous to have a PEC containing both strong and weak acid groups, such as when the PEC is to be employed in prosthetic devices.

The PEC of this invention can be so functionalized by incorporating into the PA or PC repeating units having the desired functional groups. In general, this is accomplished by including in the reaction mixtures for the PC or the PA an amount of a copolymerizable monomer which bears the desired functional group in an amount less than that which renders the resulting polyion insoluble in water and less than that which renders the resulting PEC nonthermoplastic. For example, carboxyl groups can be readily incorporated into the PA by the copolymerization of acrylic acid with styrene sulfonate or sodium vinyl sulfonate. Epoxy functionalities are readily imparted to the PEC of this invention by copolymerizing a quantity of glycidyl methacrylate to the PA or the PC. The resulting PEC will contain free epoxy groups which can be reacted with compounds such as amines, phenols, organic acids, proteins and the like to form diverse structural modifications of the PEC. The functional group-bearing monomer employed herein is one which is copolymerizable with the other monomers employed to make the PC or PA and one which does not react with the ionic groups of the PA or PC.

Exemplary monomers containing functional groups which can be employed in the PEC of this invention include acrylic acid, glycidyl acrylate, glycidyl methacrylate, vinylpyrrolidone, acrolein, acryloyl chloride, acrylamide, hydroxyethyl acrylate and the like. It is noted that acrylic acid may be copolymerized into the PC if the polymerization is carried out at a pH below the pKa of acrylic acid.

PEC having free $-SO_3^-$ and $-COOH$ groups are advantageously prepared using (a) a PA having both sulfonate and carboxyl groups or (b) a PC having carboxyl groups. The PC may contain carboxyl groups if it is formed and maintained at low pH, i.e., a pH of less than 6, preferably less than 4. Such PEC having free $-SO_3^-$ and $-COOH$ groups are prepared in acidic medium, preferably at a pH in the range from about 1 to about 4. It has been found that when carboxyl groups are present in the PA or PC, complete complexing between $-SO_3^-$ and cationic groups does not occur at low pH. Accordingly, more than a stoichiometric amount of $-SO_3^-$ groups must be added to the complex before it will precipitate from solution, thereby yielding a PEC having both free $-SO_3^-$ groups and $-COOH$ groups. Said carboxyl groups may be ionized to form free carboxylate groups in the PEC by increasing the pH so that at least some of said $-COOH$ groups dissociate. In general, some dissociation will occur above a pH of about 3, which dissociation increases until the pH is about 8. At a pH of over about 8, essentially all of the $-COOH$ groups will dissociate to form carboxylate groups.

The PEC of this invention are thermoplastic, i.e., they soften upon heating to form moldable fluids. In particular, the PEC of this invention become flowable at temperatures conventionally used in the molding extrusion of plastics, i.e., from about 130° to 300° C., preferably 150° to 250° C., more preferably 170° to 210° C. Accordingly, the PEC can be molded and extruded using equipment and processes conventionally employed in the molding and extrusion of other thermoplastics.

The PEC of this invention can be mixed with various inorganic pigments and fillers, other inert fillers, such as wood fibers and other thermoplastic materials. These various mixtures can then be molded and extruded to form an article having improved physical properties than when the corresponding article was made with the PEC alone. The PEC of this invention can be extruded or blended with thermoplastic such as nylon or polyethylene to form fibers which exhibit excellent dye acceptance and antistatic properties.

These thermoplastic PEC are suitably employed in any of the applications for which conventional PEC are used including reverse osmosis, dialysis or ultra-filtration membranes, antithrombogenic plastics, antistatic agents, dye acceptors, battery separators or components in artificial leathers.

The following examples are intended to illustrate the invention and not to limit the scope thereof. All parts and percentages are by weight unless otherwise noted.

EXAMPLE 1

A. Preparation of Polycation

Into a 1-liter flask equipped with a stirrer are loaded the following ingredients:
deionized water: 290.8 grams
alkyltrimethylammonium emulsifier: 11.2 grams
butyl acrylate: 33.2 grams
styrene: 27.0 grams
vinylbenzyl chloride: 19.8 grams
Fe III solution: 4.0 grams
0.1N HCl: 4.0 grams The proportion of monomers employed is 40 mole percent butyl acrylate, 40 mole percent styrene and 20 mole percent vinylbenzyl chloride. The flask is purged with nitrogen for 30 minutes and 8.0 grams of a 30 percent solution of hydrogen peroxide in water and 2.0 grams of mercaptoethanol are added. The mixture is then heated with stirring to 65° C. and kept under a nitrogen atmosphere. The reaction is continued until the conversion reaches about 100 percent. The flask is cooled and the reaction mixture filtered, yielding a product having 20 weight percent solids. The product is then quaternized by shaking for 6 l hours with a 15 mole percent excess of dimethyldodecylamine. The quaternized solution is then dialyzed through a hollow fiber dialyzer.

B. Preparation of Polyanion

Into a 2-liter flask are placed 260 grams of deionized water, 260 grams of methanol and 30 grams of sodium metabisulfite. Nitrogen is bubbled through the contents of the flask for 30 minutes and the mixture is heated to 60° C. Over a 3-hour period are added in simultaneous but separate streams a solution of 134 grams ethyl acrylate and 310 grams methanol, 398 grams of the 22 percent active solution of sodium vinyl sulfonate in water and a solution of 10 grams sodium persulfate in 65 grams of deionized water. The sodium persulfate feed is continued for 15 minutes after the monomer feeds are completed. After completion of all the feed streams, heating is continued for one hour. The methanol is then stripped off by vacuum distillation and the resulting aqueous solution dialyzed through a hollow fiber dialyzer. The ethyl acrylate/sodium vinyl sulfonate mole ratio in the polymer is 3.19:1.

C. Preparation of Polyelectrolyte Complex

The PC and the PA prepared in Parts A and B of this example are each diluted with water to yield solutions containing 0.63 percent and 10.2 percent solids, respectively. A 287-gram portion of the PC solution is placed into a beaker and stirred at 1500 rpm. A 13.8-gram portion of the PA solution is then added to the stirred PC solution until the complex precipitates leaving behind a clear supernatant liquid. The PEC is dried in a vacuum oven overnight at 40° C.

A sample of the PEC thus obtained is molded using a molding assembly consisting of two 8 in.×8 in. steel platens, two 6½ in.×6½ in. sheets of 2 mil Teflon ® film (trademark of E. I. du Pont de Nemours & Co.) and one 7 in.×7 in. chase with 4 in.×4 in. center opening. An 8.5 -gram portion of the PEC is placed into the chase center and the molding assembly inserted into a press at 180° C. The molding is heated for 2 minutes at which time the platen pressure is increased to 10,000 pounds. Heating is continued for 2 additional minutes and the pressure is then increased to 15,000 pounds for 2 more minutes. The heat is then removed and the molding cooled until the temperature returns to ambient. A transparent molding is obtained.

"Dog bone" bars having a cross-section measuring of ⅛ in.×30 mils are die cut and tested for elongation and tensile strength at 73° F. and 50 percent relative humidity. Testing is performed using an Instron tensile tester operated at a rate of 2 inches per minute. The tensile strength of PEC is determined to be 481 psi and elongation at break is 318 percent.

EXAMPLES 2-8

PEC Example Nos. 2-8 are prepared from various PC and PA having the structures as indicated in Table I below. All PC are prepared using the general procedures described in Example 1 and all PA are prepared as in Example 1 except using different ratios of monomer as needed to obtain the polymers indicated. In Examples 2-4, a mercaptoethanol chain transfer agent is employed in the polymerization reaction. The PEC are prepared according to the general procedure described in Example 1 above to yield essentially neutral complexes which are molded as described in Example 1. The elongation and tensile strength of tensile bars cut from the molding are as given in Table I below.

TABLE 1

| Example No. | Polycation VBC/S/BA Mole %[1] | Amine[2] | CTA[3] | Polyanion EA/SVA Mole Ratio[4] | Tensile Strength psi[5] | Elongation[6] % |
|---|---|---|---|---|---|---|
| 2 | 40/40/20 | 2 | Yes | 3.19 | 140 | 455 |
| 3 | 40/40/20 | 1 | Yes | 1.23 | 697 | 234 |
| 4 | 40/40/20 | 2 | Yes | 5.03 | 97 | 554 |
| 5 | 60/20/20 | 1 | No | 1.23 | 443 | 218 |
| 6 | 60/20/20 | 2 | No | 1.23 | 204 | 217 |
| 7 | 60/20/20 | 2 | No | 3.19 | 18 | 787 |

TABLE 1-continued

| Example No. | Polycation VBC/S/BA Mole %[1] | Amine[2] | CTA[3] | Polyanion EA/SVA Mole Ratio[4] | Tensile Strength psi[5] | Elongation[6] % |
|---|---|---|---|---|---|---|
| 8 | 60/20/20 | 1 | No | 5.03 | 57 | 979 |

[1]All polycations are quaternized vinylbenzyl chloride/styrene/butylacrylate terpolymers with VBC = vinylbenzyl chloride, S = styrene and BA = butyl acrylate. The mole percent of each monomer is expressed as a percentage of all monomers employed in the polymerization reaction to prepare the PC.
[2]A "1" indicates that the polycation is quaternized using dimethyldodecylamine $(CH_3)_2N(C_{12}H_{25})$. A "2" indicates that the polycation is quaternized using dimethylhexadecylamine $(CH_3)_2N(C_{16}H_{33})$. All quaternizations are carried out by mixing the polymer with a 15 mole percent excess of the amine for 6 hours at room temperature.
[3]The use of mercaptoethanol chain terminating agent in the polymerization of the VBC/S/BA terpolymer is indicated.
[4]EA = ethyl acrylate; SVS = sodium vinyl sulfonate. The indicated ratio of EA to SVS units in the polyanion is as determined by analysis of the sulfonate groups in the polymer.
[5]Tensile strength of ⅛ inch × mil dog bone bars using an Instron tensile tester. All moldings are transparent and slightly amber.
[6]Elongation at break is determined on an Instron tensile tester operated at 2 inches per minute, at 73° F. and 50 percent relative humidity.

As can be seen from the table, a wide range of elongation and tensile strength can be exhibited by the various PEC. In general, higher elongation is favored by a greater proportion of soft monomer employed in the PA and longer alkyl substitution in the ammonium group. Nonetheless, even Example 3, in which relatively low amounts of soft monomer are present in both the PC and the PA and shorter alkyl groups are present in the quaternary ammonium group, a readily moldable product is obtained.

EXAMPLES 9-15

PEC are prepared according to the methods of Example 1 this time using as the PC an 2-ethylexyl acrylate/styrene/vinylbenzyl chloride polymer quaternized as indicated in Table II. The PC is prepared accordng to the general procedure described in Example 1 above, substituting 2-ethylhexyl acrylate for butyl acrylate. Moldings are prepared as described in Example 1 above and tensile bars cut therefrom which are tested for elongation and tensile strength. The results are given in Table II below.

TABLE II

| Example No. | Polycation EHA/S/VBC Moles %[1] | Amine[2] | CTA[3] | Polyanion EA/SVA Mole Ratio[4] | Tensile Strength psi[5] | Elongation[6] % |
|---|---|---|---|---|---|---|
| 9 | 60/20/20 | 1 | No | 1.23 | 164 | 96 |
| 10 | 60/20/20 | 2 | No | 1.23 | 59 | 132 |
| 11 | 60/20/20 | 2 | No | 3.19 | 5 | 1299 |
| 12 | 60/20/20 | 1 | No | 5.03 | 21 | 614 |
| 13 | 40/40/20 | 2 | No | 3.19 | 59 | 408 |
| 14 | 40/40/20 | 1 | No | 1.23 | 395 | 202 |
| 15 | 40/40/20 | 1 | No | 5.03 | 120 | 524 |
| 16 | 40/40/20 | 2 | No | 5.03 | 37 | 960 |

[1]EHA = 2-ethylhexylacrylate, S = styrene, VBC = vinylbenzyl chloride. All polycations are terpolymers of the indicated monomers with the mole percent of each expressed as a percentage of all monomers employed in the polymerization reaction.
[2-6]Same as Footnotes 2-6 in Table I.

As can be seen from Examples 9-16, the substitution of 2-ethylhexyl acrylate for butyl acrylate results in PEC having generally lower tensile strength and higher elongation. However, the general trends noted in Examples 2-8 are generally seen in Examples 9-16 also. All moldings obtained are transparent and slightly amber in color.

EXAMPLE 17

This example demonstrates the formation of a thermoplastic polyelectrolyte complex containing both free $—SO_3^-$ and COOH groups.

A polyanion is prepared by charging a reaction vessel with 315 grams of deionized water, 315 grams of methanol and 40 grams sodium metabisulfite. The mixture is heated to 60° C. and to it are added, over a 3-hour period, separate but simultaneous streams containing 138.8 grams of ethyl acrylate, 210 grams of methanol and 15.9 grams of acrylic acid and 308.0 grams of 22 percent active sodium vinyl sulfonate. A third stream containing 115 grams deionized water and 10 grams of sodium persulfate is added over 3½ hours. Following the addition of all ingredients, the reaction mixture is heated one hour at 60° C. The methanol is then removed by vacuum distillation, and the resulting product dialyzed to yield a polyion containing 2.03 meq/g $—SO_3^-$ groups and 1.022 meq/g COOH groups.

Samples of this polyanion are complexed with a butylacrylate/styrene/vinylbenzyl dimethyl hexadecyl ammonium chloride polycation at various pH levels. Since carboxyl groups are not fully ionized at low pH levels, said groups will not be available to complex with the polycation at low pH levels. Thus, at low pH levels, essentially all ionic crosslinks with the polycation will be with sulfonate groups.

Complexes are prepared by adding to a solution of a polycation having 1.0 meq of cationic groups, a solution of the polyanion of this example sufficient to cause the precipitation of the polyelectrolyte complex. In each case, the amount of $SO_3^-$ and COOH groups available in the polyanion, and the amount of free $SO_3^-$ and COOH groups present in the PEC are determined. The results are as given in Table III below.

TABLE III

| Sample No. | pH | PA (g)[1] | $SO_3^-$ in[2] PA (meq) | COOH in[3] PA (meq) | $(SO_3^- + COOH)$[4] PA (meq) | Free $(SO_3^- + COOH)$[5] in PEC (meq) |
|---|---|---|---|---|---|---|
| 17A | 1.73 | 0.764 | 1.55 | 0.78 | 2.33 | 1.33 |
| 17B | 2.54 | 0.764 | 1.55 | 0.78 | 2.33 | 1.33 |
| 17C | 3.10 | 0.764 | 1.55 | 0.78 | 2.33 | 1.33 |
| 17D | 3.65 | 0.704 | 1.43 | 0.72 | 2.15 | 1.15 |
| 17E | 4.70 | 0.606 | 1.23 | 0.62 | 1.85 | 0.85 |
| 17F | 5.10 | 0.537 | 1.09 | 0.55 | 1.64 | 0.64 |
| 17G | 9.20 | 0.345 | 0.70 | 0.35 | 1.05 | 0.05 |
| 17H | 11.93 | 0.330 | 0.67 | 0.33 | 1.00 | 0.00 |

[1] The polyanion is an ethylacrylate/acrylic acid/sodium vinyl sulfonate terpolymer having a —$SO_3^-$ contents of 2.03 meq/g and a —COOH content of 1.022 meq/g. The weight employed to cause precipitation with 1.0 meq of a polycation is reported.
[2] The amount of $SO_3^-$ groups present in the polyanion used to form the PEC, calculated as the product of the weight of the polyanion used and the $SO_3^-$ content of the polyanion.
[3] The amount of COOH groups present in the polyanion employed herein, calculated from the weight of the polyanion employed and the milliequivalents of —COOH groups per gram of polyanion.
[4] Calculated by adding ([2]) and ([3]).
[5] Free $SO_3^-$ and COOH groups in the polyelectrolyte complex, calculated by subtracting the number of milliequivalents of polycation used (1.0 in all cases) from the $\oplus SO_3^-$ and the COOH content in the polyanion.

It can be seen from Table III that at lower pH levels, all complexing is due to the presence of $SO_3^-$ groups in the PA. As the pH is increased, however, —COOH groups also become available for complexing, and less of the PA is needed to form a stoichiometric PEC. It is also noted that at low pH levels, more of the PA is required to form an insoluble complex than is expected from the relative charge densities on the polyanion and the polycation. Accordingly, the PEC formed at low pH using a PA containing both sulfonate and carboxyl groups contain both free —$SO_3^-$ groups and —COOH groups.

What is claimed is:

1. A thermoplastic polyelectrolyte complex comprising (a) a water-soluble polyanion which is a polymer having a plurality of anionic groups which polyanion is ionically crosslinked with (b) a water-soluble polycation which polycation is a polymer containing a plurality of pendant cationic moieties wherein at least one of the polyanion or polycation contains repeating soft mers, and wherein the proportion of said soft mers contained in said polyanion and polycation and the cationic moieties present in said polycation are chosen such that said polyelectrolyte complex is thermoplastic.

2. The polyelectrolyte complex of claim 1 wherein the polyanion contains repeating units derived from a soft monomer.

3. The polyelectrolyte complex of claim 1 wherein the polycation contains repeating units derived from a soft monomer.

4. The polyelectrolyte complex of claim 1 wherein both the polyanion and polycation contain repeating units derived from a soft monomer.

5. The polyelectrolyte complex of claim 3 or 4 wherein both the polyanion and polycation contain repeating units derived from a $C_1$ to $C_{12}$ alkyl acrylate.

6. The polyelectrolyte complex of claim 1 where the polyanion and/or polycation containing repeating units derived from a soft monomer also contains repeating units derived from a hard monomer.

7. The polyelectrolyte complex of claim 1 wherein the cationic group is a quaternary ammonium, tertiary ammonium, pyridinium, phosphonium or sulfonium.

8. The polyelectrolyte complex of claim 7 wherein the cationic group is an ammonium ion as represented by the general structure:

wherein $R^1$ $R^2$ and $R^3$ are each independently inertly substituted alkyl or polyether groups containing from 1 to about 30 carbon atoms, provided that the groups $R^1$, $R^2$ and $R^3$ together contain at least 5 carbon atoms.

9. The polyelectrolyte complex of claim 8 wherein $R^1$ and $R^2$ are each methyl and $R^3$ is an alkyl group having from 6 to 16 carbon atoms.

10. The polyelectrolyte complex of claim 9 wherein $R^3$ is a dodecyl or hexadecyl group.

11. The polyelectrolyte complex of claim 1 or 7 wherein the polyanion is a polymer containing a plurality of sulfonate or carboxylate groups.

12. The polyelectrolyte complex of claim 1 wherein at least one of the PA or PC contains a plurality of free functional groups.

13. The polyelectrolyte complex of claim 12 wherein at least one of the polyanion and polycation contains repeating units derived from a glycidyl ester of an $\alpha,\beta$-unsaturated carboxylic acid.

14. The polyelectrolyte complex of claim 1 or 9 wherein the polyanion is a polymer containing sulfonate groups and carboxyl and/or carboxylate groups.

15. The polyelectrolyte complex of claim 14 wherein said polyelectrolyte complex is prepared under acidic conditions such that said polyelectrolyte complex contains free sulfonate groups and free carboxyl and/or carboxylate groups.

* * * * *